US008929025B2

(12) United States Patent
Chiang et al.

(10) Patent No.: US 8,929,025 B2
(45) Date of Patent: Jan. 6, 2015

(54) CLAMPING DEVICE FOR A ROTATABLE COMPONENT OF A MACHINE INCLUDING A BALANCE HOLE CONFIGURED TO CONFINE A COUNTERWEIGHT

(75) Inventors: Chisin Chiang, San Jose, CA (US); Antony Nguyen, San Jose, CA (US); Jr-Yi Shen, Sunnyvale, CA (US)

(73) Assignee: HGST Netherlands B.V., Amsterdam (NL)

( * ) Notice: Subject to any disclaimer, the term of this patent is extended or adjusted under 35 U.S.C. 154(b) by 552 days.

(21) Appl. No.: 12/887,461

(22) Filed: Sep. 21, 2010

(65) Prior Publication Data

US 2012/0069469 A1 Mar. 22, 2012

(51) Int. Cl.
*G11B 17/02* (2006.01)
*G11B 33/08* (2006.01)
*G11B 17/028* (2006.01)
*G11B 25/04* (2006.01)

(52) U.S. Cl.
CPC .......... *G11B 33/08* (2013.01); *G11B 17/0287* (2013.01); *G11B 25/043* (2013.01)
USPC ................ 360/99.12; 360/98.08; 360/99.08

(58) Field of Classification Search
USPC ................. 360/97.01, 98.08, 99.08, 99.12
See application file for complete search history.

(56) References Cited

U.S. PATENT DOCUMENTS

| | | | |
|---|---|---|---|
| 3,817,088 A | 6/1974 | Herbig | |
| 3,838,464 A * | 9/1974 | Doyle | 360/137 |
| 4,958,873 A | 9/1990 | Akagawa | |
| 5,130,870 A * | 7/1992 | Jabbari | 360/99.08 |
| 5,154,019 A * | 10/1992 | Day | 49/504 |
| 5,295,030 A | 3/1994 | Tafreshi | |
| 5,422,776 A * | 6/1995 | Thorson et al. | 360/98.07 |
| 6,065,368 A * | 5/2000 | Sohn | 74/570.2 |
| 6,158,112 A | 12/2000 | Kim et al. | |
| 6,504,673 B2 | 1/2003 | Choo et al. | |
| 7,064,923 B2 * | 6/2006 | Tran et al. | 360/99.08 |
| 7,230,728 B2 | 6/2007 | Su | |
| 7,295,400 B2 | 11/2007 | Tran et al. | |
| 7,483,239 B2 * | 1/2009 | Hiramatsu et al. | 360/99.08 |
| 7,529,064 B1 * | 5/2009 | Huang et al. | 360/99.08 |
| 7,630,171 B2 | 12/2009 | Lee et al. | |
| 2007/0242388 A1 | 10/2007 | Goksel et al. | |
| 2008/0024925 A1 * | 1/2008 | Shikano | 360/244 |

OTHER PUBLICATIONS

Hredzak, et al., "New Passive Balancing Algorithm for High-Density Hard Disk Drives", *Proc. Instn Mech. Engrs* vol. 218 Part C, (2004),401.
Hredzak, et al., "A Method for Improving The Resolution of Active and Passive Balancing Schemes for Disc Drives", *Engineering Optimization*, vol. 38, No. 2 Taylor and Fracis Ltd, (Mar. 2006),245-255.
Hredzak, et al., "Adjustable Balancer With Electromagnetic Release of Balancing Members", *IEEE Transactions on Magnetics* vol. 42, Issue 5, (May 2006),1591-1596.

* cited by examiner

*Primary Examiner* — Wayne Young
*Assistant Examiner* — Carlos E Garcia

(57) ABSTRACT

A clamping device for coupling a rotatable component of a machine with a shaft, including a balance hole configured to confine a counterweight. The clamping device includes a circular plate. The circular plate includes at least one fastener hole configured to accept a fastener, and at least one balance hole. The fastener is configured to fasten the clamping device to couple the component with the shaft. The balance hole includes a cavity configured to accept a counterweight. The counterweight is configured to balance the rotational motion of at least the circular plate when the shaft is rotated. Moreover, the cavity is configured to confine the counterweight to an end of the cavity by effects of rotation of the shaft on the counterweight when the shaft is rotated.

23 Claims, 4 Drawing Sheets

CLAMPING DEVICE FOR A ROTATABLE COMPONENT OF A MACHINE INCLUDING A BALANCE HOLE CONFIGURED TO CONFINE A COUNTERWEIGHT

TECHNICAL FIELD

Embodiments of the present invention relate generally to machines having a clamping device for a rotatable component, and in particular to the field of hard-disk drives (HDDs).

BACKGROUND

With the advance of HDD technology, the spacing between a magnetic-recording head and a magnetic-recording disk has become progressively smaller, on the order of a few nanometers (nm). Consequently, small mechanical disturbances in airflow that can affect the head-to-disk spacing, or fly-height, have become of greater concern. For example, mechanical oscillations associated with the spinning magnetic-recording disk can give rise to head-disk interference (HDI) events that can affect the fly-height, and may even give rise to errors in the recording, or retrieval, of information stored on the magnetic-recording disk. Thus, engineers and scientists engaged in the development of HDDs are becoming increasingly more interested in providing an HDD environment of high reliability for the storage of information, and HDD designs at reduced costs.

SUMMARY

Certain embodiments of the present invention include a clamping device for coupling a rotatable component of a machine with a shaft, including a balance hole configured to confine a counterweight. The clamping device includes a circular plate. The circular plate includes at least one fastener hole configured to accept a fastener, and at least one balance hole. The fastener is configured to fasten the clamping device to couple the component with the shaft. The balance hole includes a cavity configured to accept a counterweight. The counterweight is configured to balance the rotational motion of at least the circular plate when the shaft is rotated. Moreover, the cavity is configured to confine the counterweight to an end of the cavity by effects of rotation of the shaft on the counterweight when the shaft is rotated. In addition, other embodiments of the present invention include a disk clamp for coupling a magnetic-recording disk with a spindle of a HDD, including a balance hole configured to confine a counterweight, as well as a HDD including the disk clamp.

DESCRIPTION OF THE DRAWINGS

The accompanying drawings, which are incorporated in and form a part of this specification, illustrate embodiments of the invention and, together with the description, serve to explain the embodiments of the invention.

Figure 1:
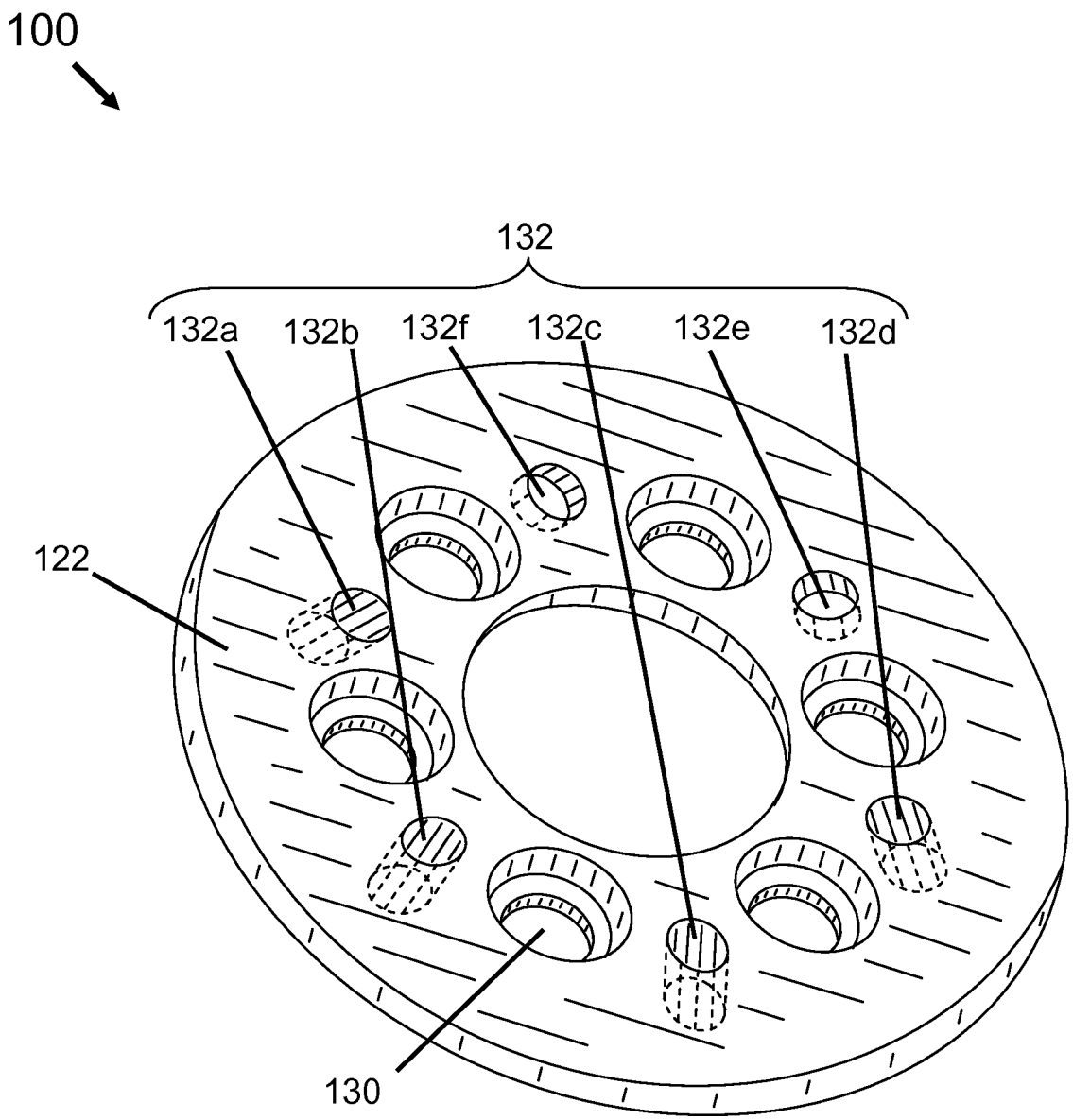
FIG. 1 is a perspective view of a clamping device for coupling a rotatable component of a machine with a shaft that shows the arrangement of balance holes and fastener holes, in accordance with embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be appreciated that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Figure 2:
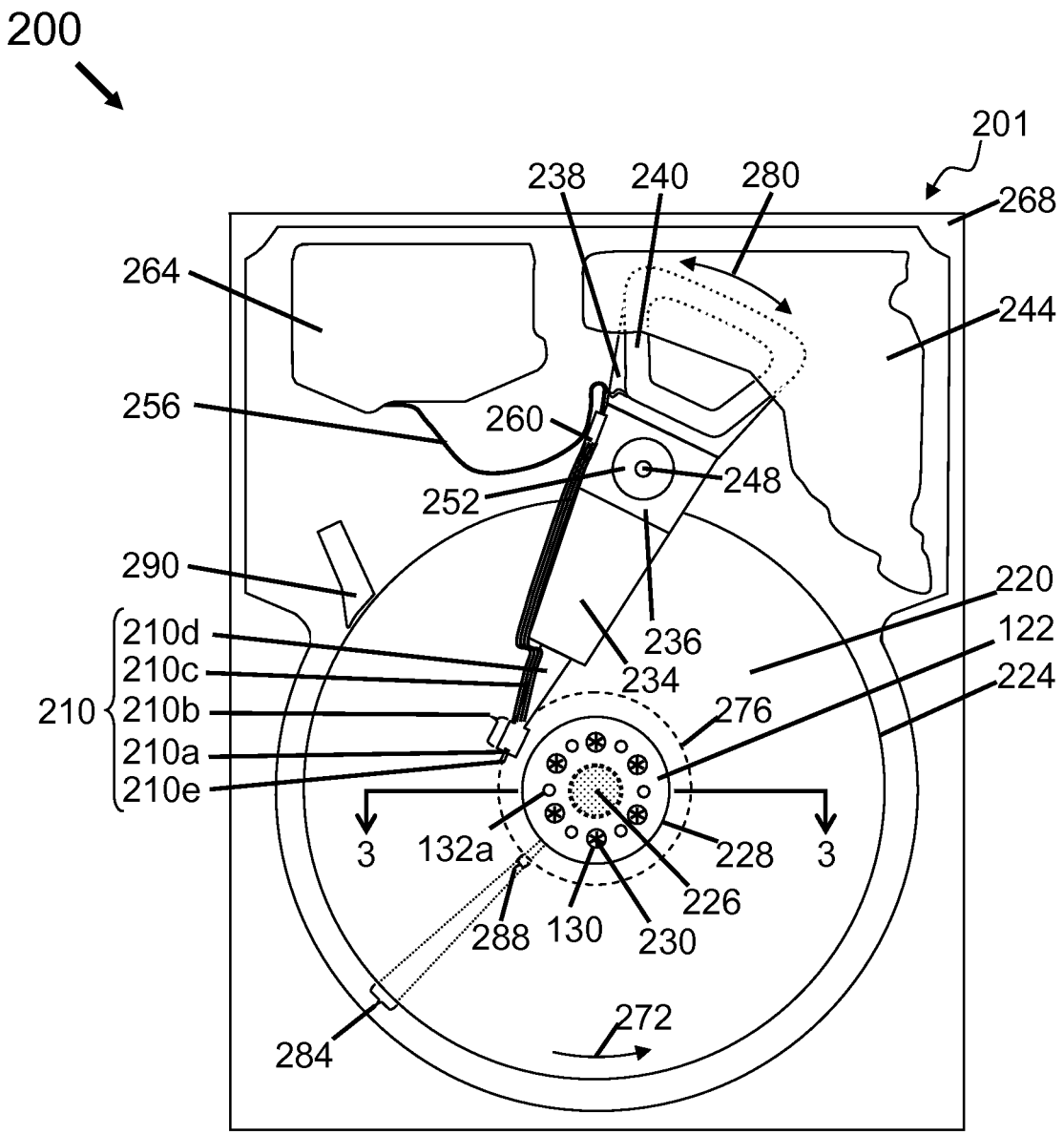
FIG. 2 is a plan view showing the arrangement of an example clamping device, a disk clamp, within the example environment of a hard-disk drive (HDD), in accordance with embodiments of the present invention.

Physical Description of Embodiments of a Clamping Device for a Rotatable Component of a Machine Including a Balance Hole Configured to Confine a Couterweight With reference now to FIG. 1, in accordance with embodiments of the present invention, a perspective view 100 is shown of a clamping device, for example, a disk clamp 122 of a hard-disk drive (HDD) 201 as shown in FIG. 2, without limitation thereto, that is configured for coupling a rotatable component of a machine with a shaft, for example, a magnetic-recording disk 220 of HDD 201 with spindle 226 as shown in FIG. 2, without limitation thereto. Although as subsequently described the machine may be, for example, a HDD, other example environments in which the clamping device may be used include machines such as: turbines, motors, generators, fans, compressors, pumps, and other machines that have rotatable components, without limitation thereto. FIG. 1 shows the arrangement of a plurality 132 of balance holes 132*a*, 132*b*, 132*c*, 132*d*, 132*e* and 132*f*, and fastener holes, of which fastener hole 130 is an example. By way of example, without limitation thereto, the balance holes 132*a*-132*f* and fastener holes, of which fastener hole 130 is an example, and the edge of the clamping device are shown with abrupt corners; however, embodiments of the present invention also include balance holes and fastener holes and an edge of the clamping device that are chamfered to prevent the generation of particles in assembly that might detract from reliability of the machine. For example, in an environment where the machine includes a HDD, such particles are known to be a source of wear and the cause of read errors and write errors in the magnetic-recording process. In accordance with embodiments of the present invention, the clamping device, for example, disk clamp 122, for coupling a rotatable component of a machine with a shaft, including a balance hole 132a configured to confine a counterweight 432a (not shown in FIG. 1, but see FIG. 4), includes a circular plate. In accordance with embodiments of the present invention, the circular plate includes at least one fastener hole 130 configured to accept a fastener, and at least one balance hole 132a. In accordance with embodiments of the present invention, the fastener is configured to fasten the clamping device, for example, disk clamp 122, to couple the component with the shaft. In one embodiment of the present invention, the fastener may be a screw, without limitation thereto; but, other fasteners are also within the spirit and scope of embodiments of the present invention, such as: rivets, without limitation thereto. In accordance with embodiments of the present invention, the balance hole includes a cavity configured to accept a counterweight. By way of example, without limitation thereto, in accordance with embodiments of the present invention, the counterweight is configured to balance the rotational motion of at least the circular plate, for example, disk clamp 122, when the shaft is rotated; however, embodiments of the present invention also include a counterweight that is configured to balance the rotational motion of other rotatable components that may be fastened to the shaft, such as: a hub, one or more disks, which may, or may not, be magnetic-recording disks, one or more propeller blades, one or more turbine blades, one or more motor windings, one or more generator windings, one or more impellers, one or more vanes, as well as the shaft, itself, without limitation thereto. In accordance with embodiments of the present invention, the counterweight is chosen to move the center of gravity of the assembly of rotating components towards the center of the shaft to mitigate "wobbling" of the shaft about the axis of the shaft when the shaft rotates.

With further reference to FIG. 1, in accordance with embodiments of the present invention, in accordance with embodiments of the present invention, the cavity is configured to confine the counterweight to an end of the cavity by effects of rotation of the shaft on the counterweight when the shaft is rotated. As is subsequently described with reference to FIG. 4, the effects of rotation of the shaft on the counterweight may be described in terms of an inertial force within a reference frame fixed to the rotating clamping device, such as a centrifugal force, which drives the counterweight towards the outside diameter (OD) of the clamping device; because the shape of the cavity drives the counterweight towards the end of the cavity, the counterweight may be confined or trapped, either by an end of a cavity terminating within the clamping device, or by a part disposed to blank off the end of the cavity barring motion of the counterweight out of the balance hole. Thus, embodiments of the present invention provide a means for preventing the counterweight from moving out of the hole into the machine, where a loose counterweight would present a vehicle for damage to the rotating components of the machine. For example, portions of a loose counterweight that could ride up out of the hole might generate particulate debris through rubbing on other stationary parts disposed above the clamping device and shaft, which would cause wear and damage to the counterweight, as well as a stationary part, or parts. Furthermore, such particulate debris may interfere with the operation of the machine; for example, in an environment where the machine includes a HDD, the inventors have recognized that such particulate debris produced by a loose counterweight may be the cause of read errors and write errors in the magnetic-recording process. Moreover, a counterweight that might escape from the balance hole would pose a formidable obstacle to rotating components affixed to the shaft of the machine due to the inertia of the counterweight upon impacting a rotating component, and cause considerable, if not catastrophic, damage to a machine including such rotating components.

With further reference to FIG. 1, in accordance with embodiments of the present invention, the cavity of the clamping device includes an opening disposed at a first side of the circular plate; the end of the cavity is disposed below the first side of the circular plate; and, sides of the cavity connect the opening to the end of the cavity, such that the end of the cavity is disposed further away from a center of the circular plate than the opening is disposed from the center. By way of example, in one embodiment of the present invention, the first side may be a top side of the circular plate, where the term of art, "top," refers to the side of the plate that faces outward and away from the rotatable components mounted on the shaft; alternatively, the first side may be a bottom side of the circular plate, where the term of art, "bottom," refers to the side of the plate that faces towards the rotatable components mounted on the shaft. Thus, embodiments of the present invention include configurations where an axis defined through the center of the cavity slants towards the shaft such that the opening disposed closer to the shaft is located on the top of the circular plate, or alternatively, on the bottom of the circular plate; and correspondingly, the end of the cavity disposed further from the shaft is located on the bottom of the circular plate, or alternatively, on the top of the circular plate, respectively. In accordance with embodiments of the present invention, if the end of the cavity is disposed on the top of the circular plate a means for blanking off the end of the cavity is provided so that the counterweight is barred from escaping the cavity, such as a disk-clamp seal 330 (see FIG. 3), without limitation thereto, as is subsequently described. Thus, from the preceding description, in one embodiment of the present invention, the end of the cavity may include a second opening disposed at a second side of the circular plate opposite to the first side of the circular plate. In another embodiment of the present invention, the cavity includes a substantially cylindrical channel. As used herein, "substantially cylindrical" means that the channel has a cylindrical shape to within the limits of manufacturing processes such as machining, drilling or milling the channel. Alternatively, other shapes of the channel are also within the spirit and scope of embodiments of the present invention. In another embodiment of the present invention, the cylindrical channel extends from a first side of the circular plate through the circular plate to a second side of the circular plate opposite to the first side of the circular plate. In yet another embodiment of the present invention, the circular plate further includes a plurality of balance holes configured to accept a plurality of counterweights. By way of example, in another embodiment of the present invention, the clamping device further includes at least one counterweight, without limitation to a single counterweight; thus, embodiments of the present invention may include more than one counterweight, such that the counterweights are disposed to move the center of gravity of a rotating component, or components, in proximity to the center of rotation of the shaft. In another embodiment of the present invention, the circular plate further includes a plurality of fastener holes configured to accept a plurality of fasteners. In another embodiment of the present invention, the counterweight further includes a material with a density sufficient to offset an imbalance in the rotation of rotating components in the machine; thus, for a cavity having a specified volume, for example, a cylindrical cavity of a specified radius and length, embodiments of the present invention include counterweights composed of materials with sufficient density to offset the center of gravity of one or more rotating components towards the axis of rotation of the shaft.

With reference now to FIG. 2, in accordance with embodiments of the present invention, a plan view 200 of HDD 201 is shown. FIG. 2 illustrates the arrangement of components within HDD 201 including a disk clamp 122, which is one example of the clamping device previously described. In the subsequent description of HDD 201 and disk clamp 122, embodiments of the present invention incorporate within the environment of HDD 201, without limitation, the previously described embodiments of the present invention for the clamping device, as well as subsequently described embodiments of the present invention for the disk clamp 122, that are suitable for incorporation within the environment of HDD 201. Moreover, HDD 201 is but one representative environment for embodiments of the present invention, as embodiments of the present invention also encompass within their spirit and scope clamping devices for other machines with rotating components, more generally, as described above.

With further reference to FIG. 2, in accordance with embodiments of the present invention, HDD 201 includes at least one head-gimbal assembly (HGA) 210 including a magnetic-recording head 210a, a lead-suspension 210c attached to the magnetic-recording head 210a, and a load beam 210d attached to a slider 210b, which includes the magnetic-recording head 210a at a distal end of the slider 210b; the slider 210b is attached at the distal end of the load beam 210d to a gimbal portion of the load beam 210d. HDD 201 also includes at least one magnetic-recording disk 220 rotatably mounted on a spindle 226 and a drive motor (not shown) mounted in a disk-enclosure (DE) base 268 and attached to the spindle 226 for rotating the magnetic-recording disk 220. The magnetic-recording head 210a that includes a write element, a so-called writer, and a read element, a so-called reader, is disposed for respectively writing and reading information, referred to by the term of art, "data," stored on the magnetic-recording disk 220 of HDD 201. The magnetic-recording disk 220, or a plurality (not shown) of magnetic-recording disks, may be affixed to the spindle 226 with the disk clamp 122. HDD 201 further includes an arm 234 attached to HGA 210, a carriage 236, a voice-coil motor (VCM) that includes an armature 238 including a voice coil 240 attached to the carriage 236; and a stator 244 including a voice-coil magnet (not shown); the armature 238 of the VCM is attached to the carriage 236 and is configured to move the arm 234 and HGA 210 to access portions of the magnetic-recording disk 220, as the carriage 236 is mounted on a pivot-shaft 248 with an interposed pivot-bearing assembly 252. HDD 201 also includes a load-unload ramp 290 for HGA 210 that is configured to engage a tongue 210e of HGA 210 at the far distal end of HGA 210 when arm 234 is retracted from a position for flying the magnetic-recording head 210a in proximity with the magnetic-recording disk 220.

With further reference to FIG. 2, in accordance with embodiments of the present invention, electrical signals, for example, current to the voice coil 240 of the VCM, write signals to and read signals from the magnetic-recording head 210a, are provided by a flexible cable 256. Interconnection between the flexible cable 256 and the magnetic-recording head 210a may be provided by an arm-electronics (AE) module 260, which may have an on-board pre-amplifier for the read signal, as well as other read-channel and write-channel electronic components. The flexible cable 256 is coupled to an electrical-connector block 264, which provides electrical communication through electrical feedthroughs (not shown) provided by the DE base 268. The DE base 268, also referred to as a casting, depending upon whether the DE base 268 is cast, in conjunction with a DE cover (not shown in FIG. 1) provides a sealed, protective DE for the information storage components of HDD 201.

With further reference to FIG. 2, in accordance with embodiments of the present invention, other electronic components (not shown), including a disk controller and servo electronics including a digital-signal processor (DSP), provide electrical signals to the drive motor, the voice coil 240 of the VCM and the magnetic-recording head 210a of HGA 210. The electrical signal provided to the drive motor enables the drive motor to spin providing a torque to the spindle 226 which is in turn transmitted to the magnetic-recording disk 220 that is affixed to the spindle 226 by the disk clamp 122; as a result, the magnetic-recording disk 220 spins in a direction 272. The spinning magnetic-recording disk 220 creates an airflow including an air-stream, and a cushion of air that acts as an air bearing on which the air-bearing surface (ABS) of the slider 210b rides so that the slider 210b flies in proximity with the surface of the magnetic-recording disk 220 with minimal contact between the slider 210b and the magnetic-recording disk 220 in which information is recorded. The electrical signal provided to the voice coil 240 of the VCM enables the magnetic-recording head 210a of HGA 210 to access a track 176 on which information is recorded. Thus, the armature 238 of the VCM swings through an arc 280 which enables HGA 210 attached to the armature 238 by the arm 234 to access various tracks on the magnetic-recording disk 220. Information is stored on the magnetic-recording disk 220 in a plurality of concentric tracks (not shown) arranged in sectors on the magnetic-recording disk 220, for example, sector 284. Correspondingly, each track is composed of a plurality of sectored track portions, for example, sectored track portion 288. Each sectored track portion 288 is composed of recorded data and a header containing a servo-burst-signal pattern, for example, an ABCD-servo-burst-signal pattern, information that identifies a track 276, and error correction code information. In accessing the track 276, the read element of the magnetic-recording head 210a of HGA 210 reads the servo-burst-signal pattern which provides a position-error-signal (PES) to the servo electronics, which controls the electrical signal provided to the voice coil 240 of the VCM, enabling the magnetic-recording head 210a to follow the track 276. Upon finding the track 276 and identifying a particular sectored track portion 288, the magnetic-recording head 210a either reads data from the track 276, or writes data to, the track 276 depending on instructions received by the disk controller from an external agent, for example, a microprocessor of a computer system.

With further reference to FIG. 2, embodiments of the present invention encompass within their scope HDD 201 that includes a spindle 226, at least one magnetic-recording disk 220, at least one magnetic-recording head 210a disposed to read data from, and to write data to, the magnetic-recording disk 220, and the disk clamp 122. Moreover, embodiments of the present invention also encompass within their scope the disk clamp 122, itself, for coupling the magnetic-recording disk 220 with the spindle 226 of HDD 201. In accordance with embodiments of the present invention, the disk clamp 122, which is configured to couple the magnetic-recording disk 220 with the spindle 226, includes the balance hole 132a configured to confine the counterweight 432a. In accordance with embodiments of the present invention, the disk clamp 122 includes a circular plate; and, the circular plate includes a plurality of fastener holes, of which fastener hole 130 is an example, and a plurality 132 of balance holes 132a-132f. In accordance with embodiments of the present invention, the plurality of fastener holes, of which fastener hole 130 is an example, is configured to accept a plurality of fasteners, of which fastener 230 (indicated by the hex-shaped "star" representative of a Torx™ screw) is an example, such that the fasteners are configured to fasten the disk clamp 122 to couple the magnetic-recording disk 220 with the spindle 226. In accordance with embodiments of the present invention, the plurality 132 of balance holes 132a-132f is configured to accept a plurality of counterweights, of which counterweight 432a is an example (see FIG. 4); the balance hole 132a of the plurality 132 of balance holes 132a-132f includes a cavity that is configured to accept the counterweight, for example, counterweight 432a; and, the counterweight 432a is configured to balance rotational motion of at least the circular plate when the spindle 226 is rotated. Moreover, in accordance with embodiments of the present invention, the cavity is configured to confine the counterweight 432a to an end of the cavity by effects of rotation of the spindle 226 on the counterweight 432a when the spindle 226 is rotated. In accordance with embodiments of the present invention, HDD 201 further includes a hub 320, which is next described, with the aid of a section along line 3-3.

Figure 3:
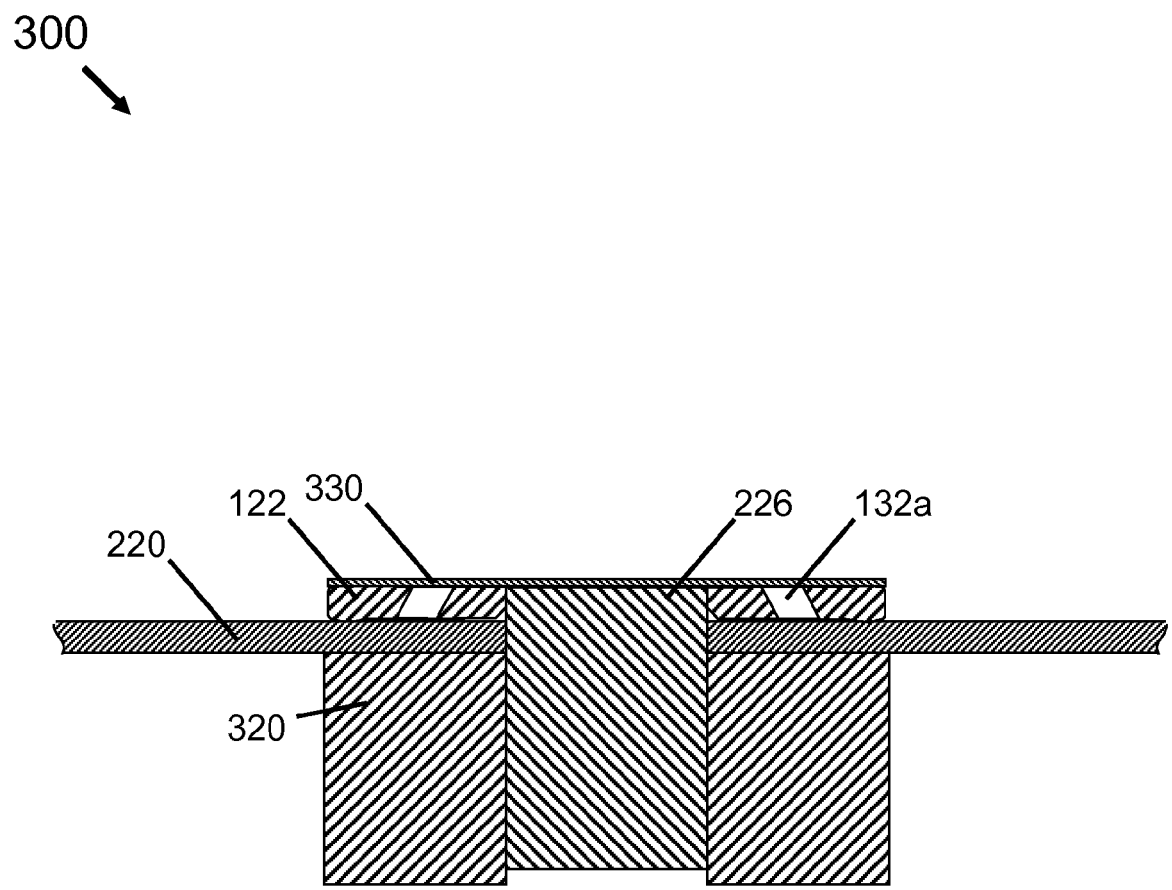
FIG. 3 is a cross-sectional elevation view through line 3-3 of FIG. 2 that details the arrangement of the disk clamp and a hub clamping a magnetic-recording disk to a spindle of the HDD of FIG. 2, in accordance with one embodiment of the present invention.

With reference now to FIG. 3, in accordance with embodiments of the present invention, a cross-sectional elevation view 300 through line 3-3 of FIG. 2 is shown. FIG. 3 details the arrangement of the disk clamp 122 and the hub 320 clamping the magnetic-recording disk 220 to the spindle 226 of HDD 201 of FIG. 2. In accordance with embodiments of the present invention, HDD 201 further includes the hub 320, such that the hub 320 is coupled with the spindle 226; the hub 320 is configured to accept the fasteners, of which fastener 230 is an example, for clamping at least one magnetic-recording disk 220 between the disk clamp 122 and the hub 320 to couple at least one magnetic-recording disk 220 with the spindle 226. Alternatively, in another embodiment of the present invention, more than one magnetic-recording disk may be clamped to a hub with a disk clamp, in which case spacer rings (not shown) may also be disposed between the magnetic-recording disks. In accordance with embodiments of the present invention, the cavity of the balance hole 132a of the disk clamp 122 includes an opening disposed at a first side of the circular plate; the end of the cavity is disposed below the first side of the circular plate; and, sides of the cavity connect the opening to the end of the cavity, such that the end of the cavity is disposed further away from a center of the circular plate than the opening is disposed from the center. In one embodiment of the present invention, the end of the cavity may include a second opening disposed at a second side of the circular plate opposite to the first side of the circular plate. In another embodiment of the present invention, the cavity includes a substantially cylindrical channel. In another embodiment of the present invention, the cylindrical channel extends from a first side of the circular plate through the circular plate to a second side of the circular plate opposite to the first side of the circular plate. HDD 201 further includes a disk-clamp seal 330; the disk-clamp seal 330 is configured to prevent the counterweight 432a from escaping from the cavity, for example, when the spindle is stationary, or not spinning, so that forces, which are next described, are no longer acting to confine the counterweight 432a to an end of the balance hole 132a.

Figure 4:
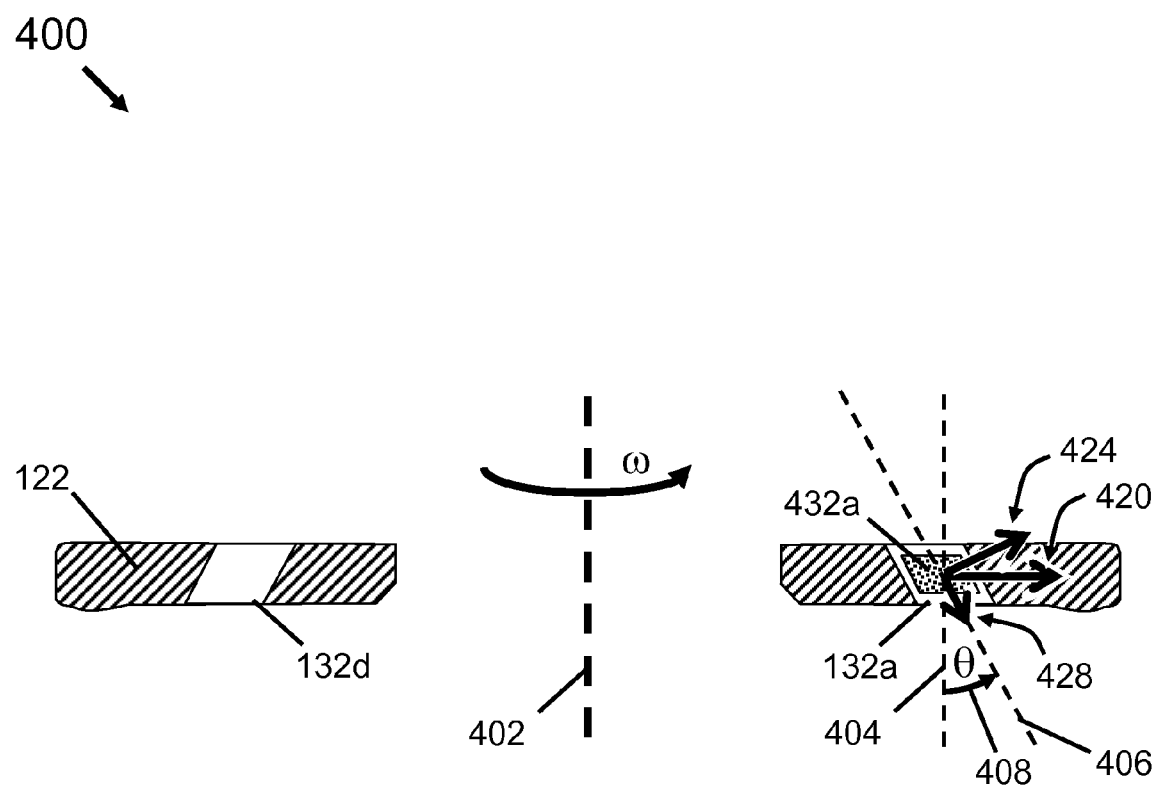
FIG. 4 is a cross-sectional elevation view through line 3-3 of FIG. 2 that details the arrangement of a counterweight in the balance hole of the disk clamp of the HDD of FIG. 2, and the action of forces acting to confine the counterweight to an end of the balance hole when the spindle is rotated, in accordance with another embodiment of the present invention.

With reference now to FIG. 4, in accordance with embodiments of the present invention, another cross-sectional elevation view 400 through line 3-3 of FIG. 2 is shown. FIG. 4 details the arrangement of the counterweight 432a in the balance hole 132a of the disk clamp 122 of the HDD of FIG. 2, without limitation thereto, and the action of forces acting to confine the counterweight 432a to an end of the balance hole 132a when the spindle 226 is rotated. The particles, in particular particulate debris that may be shed from a counterweight rising out of a balance hole and rubbing on the DE cover, pose a potential challenge to stable flight of the slider 210b and, moreover, can even damage the magnetic-recording disk 220 without affecting the stable flight of the slider 210b so that the particles may cause errors in reading data from, and writing data to, the magnetic-recording disk 220. Embodiments of the present invention provide a means to prevent the generation by a mobile counterweight of such particles within the DE of HDD 201. Thus, in one embodiment of the present invention, the cylindrical channel of the disk clamp 122 is disposed at an angle, θ, 408 to an axis 402 of rotation of the spindle 226, which is parallel to axis 404 shown, for convenience, in FIG. 4, without limitation thereto. In accordance with embodiments of the present invention, the disk clamp 122 of HDD 201 further includes at least one counterweight 432a. When the spindle rotates, for example, with an angular velocity, ω, which may be given in units of radians per unit time, an inertial force, F, 420 is generated in the reference frame of the rotating disk that acts to drive the counterweight 432a outwards away from the center of rotation. The magnitude of the inertial force, F, 420 is given by: $F=m_{CW}\omega^2 r$, where r is the radial distance of the center of gravity of the counterweight 432a from the axis 402 of rotation in the direction in which the inertial force, F, 420 is directed; and, $m_{CW}$, is the mass of the counterweight 432a. The inertial force, F, 420 may be resolved into two components: an axial component force 428, and a normal component force 424. For example, in the case of a cylindrical balance hole 132a where an axis 406 of the cylindrical balance hole 132a intersects the axis 402 of rotation, the axial component force 428 is defined by the component of the inertial force, F, 420 directed along the axis 406 of cylindrical balance hole 132a; and, the normal component force 424 is defined by the component of the inertial force, F, 420 directed at right angles to the axis 406 of cylindrical balance hole 132a. Thus, in one embodiment of the present invention, the magnitude of the axial component force 428 is given by F sin θ and, the magnitude of the normal component force 424 is given by F cos θ. However, in accordance with other embodiments of the present invention, the axis 406 of the cylindrical balance hole 132a may not intersect the axis 402 of rotation, and yet the axial component force 428 may still be defined by the component of the inertial force, F, 420 directed along the axis 406 of cylindrical balance hole 132a; and, the normal component force 424 may still be defined by the component of the inertial force, F, 420 directed at right angles to the axis 406 of cylindrical balance hole 132a. In accordance with other embodiments of the present invention, in the case where the axis 406 of the cylindrical balance hole 132a does not intersect the axis 402 of rotation, the axis 404 may be taken as an axis perpendicular to the surface of the disk clamp 122 for purposes of determining the magnitude of the axial component force 428, which may no longer be given simply by F sin θ, and the magnitude of the normal component force 424, which may no longer be given simply by F cos θ, as the axis 406 of the cylindrical balance hole may no longer be co-planar with the plane defined by the axis 402 of rotation and the radial direction of the disk in which the direction of the inertial force, F, 420 coincides; under such circumstances more complicated expressions for the of the axial component force 428 and the normal component force 424 may obtain. Nevertheless, in accordance with embodiments of the present invention, the axial component force 428 serves to confine the counterweight to an end of the cavity by effects of rotation of the spindle on the counterweight when the spindle is rotated; and, the normal component force 424 serves to raise the frictional force between the counterweight 432*a* and the wall of the cylindrical balance hole 132*a* disposed closer to the outside diameter of the disk clamp 122, which may further limit the mobility of the counterweight 432*a* in the cylindrical balance hole 132*a*. In one embodiment of the present invention, the angle, θ, 408 to the axis 402 of rotation of the spindle 226 is between about 15° and 45°. Thus, in accordance with embodiments of the present invention, when the spindle motor is rotating, the axial component force 428 may help the counterweight 432*a* to stay in, or move down further into, the balance hole 132*a*. Moreover, as a result, in accordance with embodiments of the present invention, when implementing the counterweight 432*a* with clearance to fit the balance hole 132*a*, the angle, θ, 408 may prevent the installed counterweight 432*a* from lifting towards the DE cover, where such lifting might result in interference and rubbing with the DE cover.

With further reference to FIG. 4 and further reference to FIG. 2, in accordance with embodiments of the present invention, the disk clamp 122 of HDD 201 may further include a plurality of counterweights, for example, similar to counterweight 432*a*; another balance hole of the plurality 132 of other balance holes, of which balance holes 132*b*, 132*c*, 132*d*, 132*e* and 132*f* are examples, might accommodate such an additional counterweight. Alternatively, in another embodiment of the present invention, the disk clamp 122 of HDD 201 may further include at least the one counterweight 432*a*. In another embodiment of the present invention, the counterweight 432*a* of the disk clamp 122 of HDD 201 may further include a material with a density of about 1.0 gram per cubic centimeter (gm/cm³). In another embodiment of the present invention, the counterweight 432*a* of the disk clamp 122 of HDD 201 may also be configured to balance rotational motion of at least one of the magnetic-recording disk 220, the spindle 226, and the hub 320, when the spindle 226 is rotated. In yet another embodiment of the present invention, the counterweight 432*a* of the disk clamp 122 of HDD 201 may also be configured to fit into the balance hole 132*a* without interference and has arbitrary shape. Thus, in accordance with embodiments of the present invention, the angle, θ, 408 may allow the use of multiple size counterweights for insertion into each balance hole of the plurality 132 of balance holes 132*a*-132*f*, which alleviates the design constraint to have an interference fit between a counterweight and the diameter of a balance hole in order to maintain retention of the counterweight within the balance hole. Consequently, in accordance with embodiments of the present invention, tighter design specifications can be achieved for the reduction of imbalance of rotating components in the HDD 201 due to greater choice in the options for the shape and size of a counterweight used for any single balance hole.

During development, the inventors observed that the counterweights of earlier designs, not within the scope of embodiments of the present invention, may be either installed improperly, or may roll out of a balance hole with time. Certain embodiments of the present invention utilize a balance hole disposed at the angle, θ, 408 to the axis 402 of rotation of the spindle 226 to alleviate the tendency for counterweights to lift up out of the balance hole. Moreover, the inventors in the design of rotating components for HDDs have come to recognize that embodiments of the present invention provide for tighter balance specifications that can be achieved by installing counterweights in an ad hoc manner into balance holes to alleviate imbalance of rotating components in individual HDDs.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A clamping device for coupling a rotatable component of a machine with a shaft, including a balance hole configured to confine a counterweight, said clamping device comprising:
   a circular plate, said circular plate comprising:
      at least one chamfered fastener hole formed on a top plane of said circular plate configured to accept a fastener,
   said fastener configured to fasten said clamping device to couple said component with said shaft;
      at least one round balance hole formed on said top plane of said circular plate comprising:
         a round cavity configured to accept a round counterweight, said round counterweight configured to balance the rotational motion of at least said circular plate when said shaft is rotated;
         wherein said cavity is configured to confine said counterweight to an end of said cavity by effects of rotation of said shaft on said counterweight when said shaft is rotated;
   at least one said counterweight; and
   a disk-clamp seal, said disk-clamp seal configured to prevent said counterweight from escaping from said cavity.

2. The clamping device of claim 1, said cavity comprising:
   an opening disposed at a first side of said circular plate;
   said end of said cavity disposed below said first side of said circular plate; and
   sides of said cavity connecting said opening to said end of said cavity;
   wherein said end of said cavity is disposed further away from a center of said circular plate than said opening is disposed from said center.

3. The clamping device of claim 2, wherein said end of said cavity comprises a second opening disposed at a second side of said circular plate opposite to said first side of said circular plate.

4. The clamping device of claim 1, wherein said cavity comprises a substantially cylindrical channel.

5. The clamping device of claim 4, wherein said cylindrical channel extends from a first side of said circular plate through said circular plate to a second side of said circular plate opposite to said first side of said circular plate.

6. The clamping device of claim 1, said circular plate further comprising:
   a plurality of balance holes configured to accept a plurality of counterweights.

7. The clamping device of claim 1, said circular plate further comprising:
   a plurality of fastener holes configured to accept a plurality of fasteners.

8. The clamping device of claim 1, further comprising:
   at least one said counterweight.

9. The clamping device of claim 8, said counterweight further comprising:
a material with a density sufficient to offset an imbalance in the rotation of rotating components in said machine.

10. A disk clamp for coupling a magnetic-recording disk with a spindle of a hard-disk drive, including a balance hole configured to confine a counterweight, said disk clamp comprising:
a circular plate, said circular plate comprising:
a plurality of chamfered fastener holes formed on a top plane of said circular plate configured to accept a plurality of fasteners,
said fasteners configured to fasten said disk clamp to couple said magnetic-recording disk with said spindle;
a plurality of round balance holes formed on said top plane of said circular plate configured to accept a plurality of round counterweights, a round balance hole of said plurality of balance holes comprising:
a round cavity configured to accept a round counterweight, said round counterweight configured to balance rotational motion of at least said circular plate when said spindle is rotated;
wherein said round cavity is configured to confine said round counterweight to an end of said cavity by effects of rotation of said spindle on said counterweight when said spindle is rotated;
at least one said counterweight; and
a disk-clamp seal, said disk-clamp seal configured to prevent said counterweight from escaping from said cavity.

11. The disk clamp of claim 10, said cavity comprising:
an opening disposed at a first side of said circular plate;
said end of said cavity disposed below said first side of said circular plate; and
sides of said cavity connecting said opening to said end of said cavity;
wherein said end of said cavity is disposed further away from a center of said circular plate than said opening is disposed from said center.

12. The disk clamp of claim 11, wherein said end of said cavity comprises a second opening disposed at a second side of said circular plate opposite to said first side of said circular plate.

13. The disk clamp of claim 10, wherein said cavity comprises a substantially cylindrical channel.

14. The disk clamp of claim 13, wherein said cylindrical channel is disposed at an angle to an axis of rotation of said spindle.

15. The disk clamp of claim 14, wherein said angle to said axis of rotation of said spindle is between about 15° and 45°.

16. The disk clamp of claim 13, wherein said cylindrical channel extends from a first side of said circular plate through said circular plate to a second side of said circular plate opposite to said first side of said circular plate.

17. The disk clamp of claim 10, further comprising:
at least one said counterweight.

18. The disk clamp of claim 17, said counterweight further comprising:
a material with a density of about 1.0 gm/cm³.

19. The disk clamp of claim 10, further comprising:
a plurality of counterweights.

20. A hard-disk drive, comprising:
a spindle;
at least one magnetic-recording disk;
at least one magnetic-recording head disposed to read data from, and to write data to, said magnetic-recording disk;
a disk clamp, said disk clamp configured to couple said magnetic-recording disk with said spindle, including a balance hole configured to confine a counterweight, said disk clamp comprising:
a circular plate, said circular plate comprising:
a plurality of chamfered fastener holes formed on a top plane of said circular plate configured to accept a plurality of fasteners,
said fasteners configured to fasten said disk clamp to couple said magnetic-recording disk with said spindle;
a plurality of balance holes formed on said top plane of said circular plate configured to accept a plurality of counterweights, a balance hole of said plurality of balance holes comprising:
a round cavity configured to accept a round counterweight, said round counterweight configured to balance rotational motion of at least said circular plate when said spindle is rotated;
wherein said round cavity is configured to confine said round counterweight to an end of said cavity by effects of rotation of said spindle on said counterweight when said spindle is rotated;
at least one said counterweight; and
a disk-clamp seal, said disk-clamp seal configured to prevent said counterweight from escaping from said cavity.

21. The hard-disk drive of claim 20, further comprising:
a hub, said hub coupled with said spindle, and configured to accept said fasteners for clamping at least one said magnetic-recording disk between said disk clamp and said hub to couple at least one said magnetic-recording disk with said spindle.

22. The hard-disk drive of claim 20, wherein said counterweight is configured to balance rotational motion of at least one of said magnetic-recording disk, said spindle, and a hub, when said spindle is rotated.

23. The hard-disk drive of claim 20, wherein said counterweight is configured to fit into said balance hole without interference and has arbitrary shape.

* * * * *